United States Patent [19]

Kubo et al.

[11] Patent Number: 4,901,531
[45] Date of Patent: Feb. 20, 1990

[54] RANKINE-DIESEL INTEGRATED SYSTEM

[75] Inventors: Isoroku Kubo; Amarjit S. Ghuman, both of Columbus, Ind.

[73] Assignee: Cummins Engine Company, Inc., Columbus, Ind.

[21] Appl. No.: 149,850

[22] Filed: Jan. 29, 1988

[51] Int. Cl.$^4$ .................. F01K 23/10; F01K 23/14
[52] U.S. Cl. ............................................. 60/618
[58] Field of Search .................. 60/616, 618, 620

[56] References Cited

U.S. PATENT DOCUMENTS

| | | |
|---|---|---|
| 1,011,520 | 12/1911 | Stocks ........................ 60/618 |
| 1,339,177 | 5/1920 | Dyer ........................... 60/618 |
| 3,350,876 | 11/1967 | Johnson . |
| 3,945,210 | 3/1976 | Chapin . |
| 3,979,913 | 9/1976 | Yates . |
| 4,031,705 | 6/1977 | Berg . |
| 4,087,974 | 5/1978 | Vaughan . |
| 4,197,712 | 4/1980 | Zwick et al. . |
| 4,201,058 | 5/1980 | Vaughan . |
| 4,235,077 | 11/1980 | Bryant ........................ 60/618 |
| 4,276,747 | 7/1981 | Faldella et al. ............. 60/618 |
| 4,300,353 | 11/1981 | Ridgway .................... 60/618 |
| 4,334,409 | 6/1982 | Daugas . |
| 4,348,991 | 9/1982 | Stang et al. . |
| 4,366,674 | 1/1983 | Eakman . |
| 4,586,337 | 5/1986 | Fox . |

FOREIGN PATENT DOCUMENTS

| | | | |
|---|---|---|---|
| 2414147 | 10/1975 | Fed. Rep. of Germany ........ | 60/618 |
| 400914 | 1/1932 | United Kingdom .................. | 60/618 |
| 581680 | 10/1946 | United Kingdom .................. | 60/618 |

OTHER PUBLICATIONS

"Technical and Economic Study of Stirling and Rankine Cycle Bottoming Systems for Heavy Truck Diesel Engines", I. Kubo, NASA CR-180833, Sep. 1987.

Primary Examiner—Michael Koczo
Attorney, Agent, or Firm—Neuman, Williams, Anderson & Olson

[57] ABSTRACT

A system is provided for increasing the efficiency of internal combustion engines operating at high loads and more particularly to a multi-cylinder engine in which at least one cylinder is used as the power recovery device. The waste heat generated during operation of the engine is utilized for producing an amount of energy to perform the work by means of a Rankine cycle.

1 Claim, 4 Drawing Sheets

RANKINE-DIESEL INTEGRATED SYSTEM

BACKGROUND OF THE INVENTION

This invention relates generally to a system for increasing the efficiency of internal combustion engines operating at high loads, and more particularly, to a multi-cylinder engine in which at least one cylinder is used as a power recovery device. The waste heat generated during the operation of the engine is utilized for producing an amount of energy to perform work by means of a Rankine cycle.

Diesel engines were developed to be highly reliable prime movers for transportation and stationary applications. It is generally well known, however, that while the efficiency of a diesel engine is somewhat better than that of other types of internal combustion engines, the efficiency of a diesel engine is still relatively low in terms of the conversion of the energy of the fuel consumed to energy output. At best, the mechanical power output of a conventional diesel internal combustion engine is only about thirty to forty percent of the rate at which energy is released in the combustion of the fuel. The remainder of the energy is lost to the environment primarily by the loss of heat energy from the hot exhaust gases and loss of heat through surfaces adjacent the combustion chamber. In many engines, most of the heat passing through surfaces adjacent to the combustion chamber is not transmitted directly to the environment, but is transmitted to a circulating stream of engine cooling fluid, which in turn transmits heat to the environment.

As a consequence of these inefficiencies, various systems have heretofore been proposed for recovering and utilizing the wasted heat energy from engines to generate useful power. Certain of the proposals have been for internal combustion engines with so-called "bottoming cycles" of various sorts, including Rankine cycles, where attempts have been made to extract energy from the engine exhaust gases. Such systems, however, have been beset with one or more of the following shortcomings. The system (a) is bulky and of complex construction; (b) uses a separate working fluid loop for the bottoming cycle, requiring a separate condensor and evaporator; (c) requires the use of, for example, steam turbines and reduction gears to supplement the basic engine output; (d) is quite costly and therefore is not commercially attractive to the industry; and (e) does not utilize the heat energy that is lost to the engine cooling fluid.

SUMMARY OF THE INVENTION

Thus, it is an object of the present invention to provide an improved system for recovering and utilizing the heat energy produced during operation of the engine to generate useful power which avoids one or more of the aforenoted shortcomings associated with other systems of this type.

A more specific object of the invention is to provide a system which recovers and utilizes the presently wasted heat energy generated by the engine operating at a high load to provide a force to drive a piston disposed within at least one existing cylinder of the engine, thereby effecting a saving of fuel.

Another object of the invention is to provide an integrated diesel/Rankine cycle system of the type herein described, wherein the working fluid for the bottoming cycle is the same as the engine cooling fluid.

It is a further object of the invention to provide an integrated diesel/Rankine cycle system of the type herein described, wherein the working fluid is preheated as it passes through a heat transfer means typically located at the top portion of the engine via a system of conduits.

It is a still further object of the invention to provide an improved system of the type herein described wherein the speed and power output of the expander cylinder is similar to that of the remaining cylinders of the engine when the engine is operating at a full load.

Further and additional objects will appear from the description, accompanying drawings and appended claims.

The present invention comprises a system in which waste heat generated during operation of the engine is used to generate superheated, vaporized fluid from a circulating stream of engine cooling fluid, which provides a force to drive a piston disposed within at least one cylinder of a multicylinder internal combustion engine. According to the invention generally, there is provided a multicylinder internal combustion engine with an integrated Rankine cycle where the internal combustion engine has an exhaust for exhausting combusting gases and at least one power cylinder which operates as an expander having a mechanical output for performing work.

In accordance with one embodiment of the invention, a fluid source is provided, having cooling surfaces and containing an amount of fluid which is used to cool the engine. The fluid also serves as the working fluid for the Rankine cycle. A heat transfer means is provided, including an oil cooling means, passageways in an engine cylinder head and an exhaust manifold means, for heating the engine cooling fluid with heat dissipated from the engine. Fluid from the fluid source passes through an oil cooler means, which forms a portion of the heat transfer means. A high pressure, positive displacement pump is provided for drawing an amount of the fluid from an oil cooler means outlet and passing the fluid at a predetermined pressure to a another portion of the heat transfer means typically located at the top portion of the engine, including the cylinder head and/or the exhaust manifold. First conduit means connects the high pressure pump to the oil cooler outlet and passageways which extend through a portion of the heat transfer means. The fluid is carried in a heat transfer relation through the passageways, wherein the fluid cools the engine and is simultaneously preheated to a partially vaporized state. Second conduit means provides passageways from a portion of the heat transfer means to a waste heat recovery heat exchanger or boiler, which is powered by the exhaust gases generated during operation of the engine. Intermediate means connects a source of engine exhaust gases to an inlet of the waste heat recovery heat exchanger.

In the heat exchanger or boiler,. fluid is vaporized to a saturated state and superheated and then passes, through third conduit means, to an inlet valve at a top portion of at least one cylinder of the engine. When the valve opens, the vaporized fluid passes into and is expanded in the cylinder, driving a piston disposed therein. The piston is coupled to an output component from which the mechanical energy output of the engine is available. Fourth conduit means defines passageways from an exhaust outlet on the expander cylinder to an inlet located at or adjacent to the top portion of a fluid source. Exhaust gases from the exhaust stroke of the cylinder pass through the fourth conduit means to the fluid source where they are condensed and recycled through the integrated system.

From the description, it can be appreciated that the present invention overcomes the aforenoted shortcomings of other systems in at least the following manner.

The present invention integrates a Rankine cycle into the diesel system and utilizes the engine cooling fluid as the working fluid for the bottoming cycle. The fluid source or reservoir used to cool the engine cooling fluid serves as the condensor for the bottoming cycle. This facet of the invention eliminates the separate working fluid loop used in other systems, and thus eliminates the need for a separate condensor. This in turn allows for a reduction in the size and complexity as well as the cost of the entire system.

According to another aspect of the invention, there is a preheating and partial vaporization of the working fluid as it passes in a heat transfer relation through passageways which extend through the heat transfer means. The system utilizes heat energy which is typically lost to the ambient to preheat the working fluid, and thus capitalizes on the heat energy collected by the engine coolant. The preheating also allows for a reduction in size of the waste heat recovery heat exchanger, or boiler, which is used to generate the superheated, vaporized fluid for performing the expansion work, since the size of the heat exchanger is a function of heat exchanger inlet temperature. This aspect of the present invention allows for a reduction in the size of the overall system and is particularly significant from a cost reduction standpoint, as the waste heat recovery heat exchanger or boiler cost is one of the major items of the total manufacturing cost in systems using waste heat recovery exchangers to extract energy from engine exhaust gases.

According to still another aspect of the invention, one of the existing cylinders of a multicylinder internal combustion engine is used as the power recovery device, rather than additional components such as the turbines and reduction gears employed in other systems of this type. It can be appreciated that this aspect of the present invention allows for a reduction in size of the system as well as a potential for a reduction in the complexity and the cost of the power recovery system.

Other objects and advantages of the invention will become apparent from the following specification and drawings.

DESCRIPTION

For a more complete understanding of the invention, reference should be made to the drawing wherein.

Figure 1:
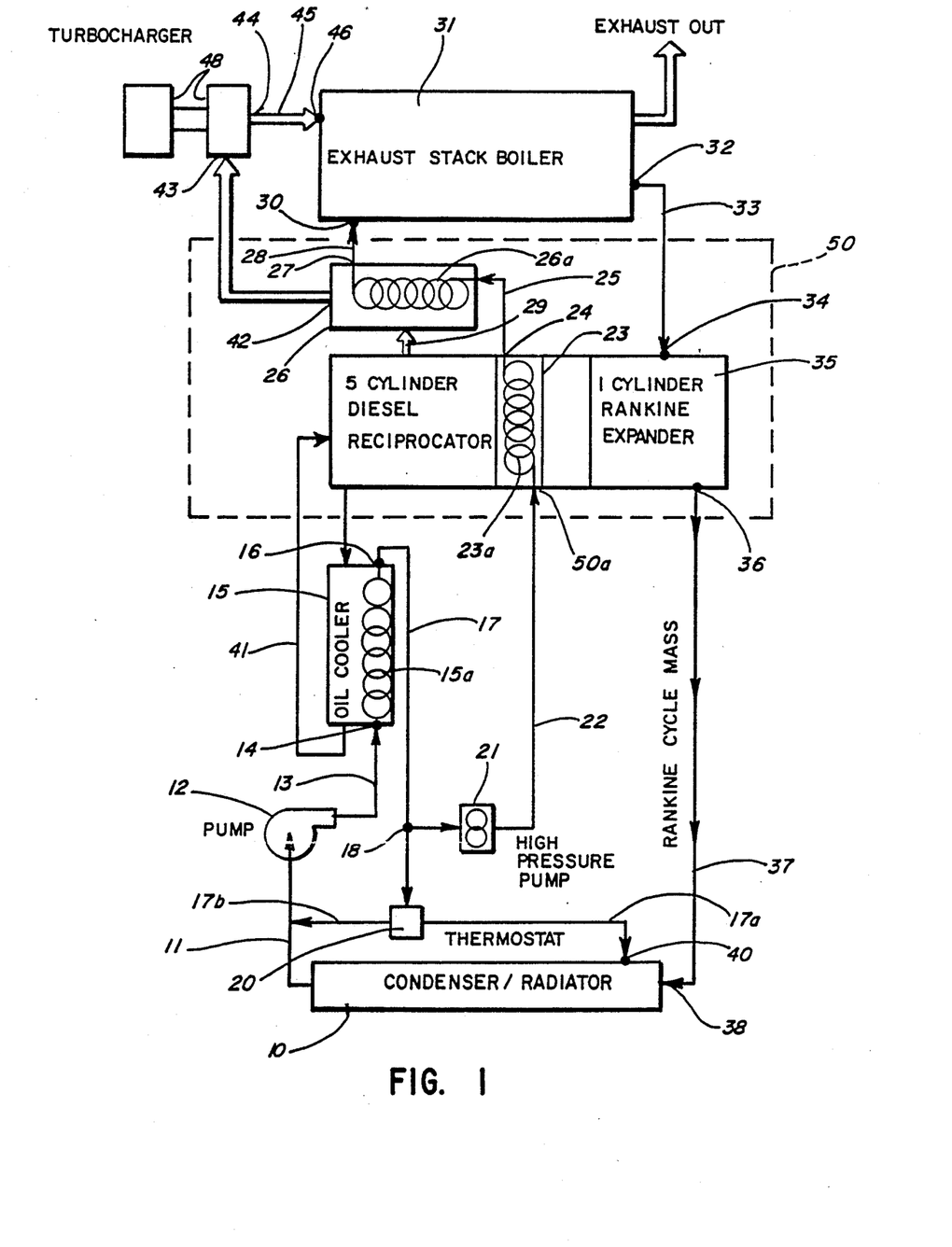
FIG. 1 is a schematic view of a preferred embodiment of the present invention.

Referring now to the drawings, and more particularly to FIG. 1, there is shown an integrated diesel/Rankine cycle system in accordance with a preferred embodiment of the invention for recovering and utilizing energy normally dissipated in the form of heat by operation of a diesel engine.

The apparatus of the present invention includes an internal combustion engine 50 having a mechanical energy output and a waste heat output. The term internal combustion engine as used herein is intended to broadly define an engine wherein combustion takes place, such that the products of combustion, together with any non-reacting substances, perform work by exerting a force on a moving surface, such as a piston, which is coupled to an output component such as a reciprocating rod or rotating shaft from which the work output or mechanical energy output of the engine is available. The increase in efficiency obtained with the present invention is particularly significant where the internal combustion engine is a turbocharged diesel engine, however other types of internal combustion engines can be used in accordance herewith. In the present embodiment, the engine is a Cummins L-10 (10 liter, 6 cylinder) diesel engine with a rated output of 250–350 hp.

More particularly, the engine is also of the type wherein the waste heat primarily comprises the hot exhaust gases generated during operation of the engine and the heat rejected by the circulating coolant. Thus, the engine includes an exhaust manifold 26. Hot exhaust gases which are collected in the manifold are routed to a waste heat recovery heat exchanger, or boiler, designated as exhaust stack boiler 31, wherein superheated vapor is generated from a preheated circulating stream of engine cooling fluid. The vapor provides a force to drive a piston disposed within at least one cylinder 35 of the engine, which operates as the expander in the bottoming cycle.

In FIG. 1, the fluid source or reservoir 10 is a conventional radiator tank designed for holding an engine cooling fluid and having cooling surfaces. The radiator tank may be of conventional construction of suitable metal or other material, having an interior of sufficient size to accommodate an amount of cooling fluid typically used to cool vehicular or stationary diesel engines currently in use in the industry.

The cooling fluid, which also serves as the working fluid for the Rankine cycle, may be selected from known organic Rankine cycle fluids. The selected fluid should have good specific heat and other properties which those skilled in the art will recognize as required of an engine coolant. Water is a particularly preferred fluid for the integrated system of the present invention. By way of example only and without limiting the fluids which may be used in accordance with the present invention, other examples include toluene, fluorinol 85, RC-1 (60% penta-fluorobenzene, 40% hexafluoro benzene) and a combination of 50% volume ethylene glycol/50% water.

The fluid source 10 is connected to a pump 12 through a conventional pipe or conduit 11 which may, for example, comprise metal tubing or conduits which are either flexible or of bendable soft metal, such as copper or aluminum. As described below, the invention contemplates use of conduit means at various points in the fluid flow path which, unless specified otherwise, may similarly be comprised of these materials. Conduit 11 leads out of the bottom of fluid source 10 and passes to the intake of pump 12. In the present example, the latter is a conventional water pump capable of delivering the coolant at a predetermined pressure (e.g. 200 psia, absolute pressure). Other types of pumps typically used in engine cooling systems may also be used in accordance herewith. The pump is driven by the engine or by a separate electric motor, not shown. It is preferred that the pump be driven by the engine, as this will reduce complexity of the system and conserve space under the hood in vehicular applications.

In a preferred embodiment which uses water as the engine cooling/working fluid, operation of the engine causes pump 12 to pump water from the fluid source 10 via conduit means 13 through an intake orifice 14 on an oil cooler 15, which forms part of the heat transfer means. The fluid passes through a passageway or chamber 15a in oil cooler 15. In the present embodiment, the water at intake orifice 14 may have a temperature of approximately 240° F. and a pressure of approximately 95 psia. Hot lubricating oil from the engine (e.g., 375° F.) is simultaneously passing in a heat transfer relation through a second passageway or chamber in oil cooler 15 via conduit means 41, thereby effecting a cooling of the hot oil and a heating of the water which is passing through chamber 15a in the oil cooler.

An amount of heat of approximately 2304 Btu/min. may be collected by the flowing water as it passes through oil cooler 15. Those skilled in the art will recognize that the amount of heat actually collected during passage through the oil cooler, and indeed throughout the remainder of the system will be dependent upon a number of factors, including rated capacity of the engine and the nature of the working fluid selected. Thus, the present values are not intended to limit the invention in any way but are provided to demonstrate the amount of heat which may be collected at the various points in the fluid flow path in an engine particularly suited for the present system.

With respect to the cooling fluid passing through the oil cooler, the amount of heat actually collected will also be dependent upon the temperature of the lubricating oil circulating through the chamber. It can thus be appreciated that a lubricant with a higher temperature capability can result in a greater efficiency of the system.

Slightly heated cooling fluid (e.g. water at about 350° F and at 95 psia) from oil cooler tank 15 passes through an outlet 16 into a conduit means 17. At a T-connector 18 provided in conduit 17, a portion of the water is diverted from the conduit 17 by a booster pump 21 and the remainder of the water continues through main conduit 17 for ultimate recycle through the system. T-connector 18 is not essential for the operation of the present invention and accordingly any means by which a portion of the fluid may be diverted from main conduit 17 by booster pump 21 may be used in accordance herewith. A thermostat 20 is operatively connected to conduit 17 downstream of the connector 18 and in parallel with booster pump 21. A temperature sensing unit of thermostat 20 detects deviation of the temperature of the circulating water from a desired value and transmits the information to a device which controls the flow of cooling fluid through supply conduit means 17a and return conduit means 17b. Thus when the temperature of the circulating water rises above a desired level, as occurs when the engine is operating at full load, the flow of circulating water is primarily through supply conduit 17a to an intake 40 on fluid source 10, wherein the water is cooled and available for recycling. When the temperature of the circulating water is below the desired level, as upon engine start-up, the circulating water is primarily through return conduit 17b for immediate recycling, thereby by-passing fluid source 10.

The portion of fluid removed from conduit 17 via connector 18 by the booster pump 21, flows into the Rankine cycle. A pump 21 may be a conventional high pressure positive displacement type capable of delivering the fluid at a predetermined high pressure and extracting at connector 18 approximately 6 lbs/min. of circulating fluid from conduit 17. Particularly preferred for this purpose is a pump 21 capable of delivering the fluid at a pressure of say 800–1000 psia, however, pumps capable of generating pressures of 500 psia may be acceptable for the present invention. The pump may be driven directly by the engine or by a separate electric motor, not shown. In the preferred embodiment, water exiting the booster pump 21 has been pressurized to approximately 1000 psia and has a slightly raised temperature, for example, of 300–400° F. Pressure can be lowered to 500 psia in accordance with the present invention, with only a slight loss in cycle efficiency.

From the foregoing description, it has been shown that a portion of the fluid originating in fluid source 10 cycles through water pump 12, oil cooler 15 and fluid source 10 via a system of conduits. Another portion of fluid originating in fluid source 10 is taken up by booster pump 21 for the Rankine cycle. In the preferred embodiment of the present invention in which the engine is the Cummins L-10, and the cycle fluid is water, a total of approximately 18 lbs/min. circulates through fluid source 10. At the rated condition, the theoretical steam flow rate for the Rankine cycle is approximately 6.0 lbs/min. Under these conditions, the flow of approximately 12.0 lbs/min. circulates only through oil cooler 15 and fluid source 10. It can thus be appreciated an amount of heat of approximately 650 Btu/min. can be collected by the water entering the Rankine cycle as a result of passage through oil cooler 15. This is heat energy which would normally be lost to the ambient through cooling, and which has been recovered by the working fluid of the present integrated system.

The fluid which exits booster pump 21 in a pressurized state is delivered to a portion 50a of engine 50 through a conduit 22 and then is circulated through a passageway 23a in a cylinder head 23, and into passageway 26a integral with exhaust manifold 26, both of which also form a portion of the heat transfer means. The fluid passes through the cylinder head 23 via a pipe forming a passageway 23a, which is formed from one of a number of metals and cast directly into the cylinder head. As is well within the skill of the art, the pipe may be cast into the cylinder head at the time of manufacture. Steel tubing is the preferred material for the pipe forming the fluid passageway 23a through the cylinder head and should have a diameter allowing for a 10 ft/sec. flow through the system at this point. The circulating fluid entering at inlet 50a cools the cylinder head 23 and is simultaneously heated to a partially vaporized state. In the present embodiment, the water may collect an amount of heat of approximately 1130 Btu/min. during passage through the cylinder head. It can thus be appreciated that a fairly significant amount of heat energy, which is normally lost to the atmosphere through cooling of the circulating fluid, can be collected by directing the working fluid through the cylinder head 23 in accordance with the present invention. At the point in the flow process where the partially vaporized fluid exits the cylinder head, the temperature is approximately 550° F.

As shown in FIG. 1, at an outtake 24 of cylinder head 23, the partially vaporized heated fluid passes through conduit means 25 to a passageway 26a, such as a metal chamber, which runs the length of exhaust manifold 26 and which can be molded to the manifold at the time of manufacture. The chamber may take the form of a conventional waterjacket or a plurality of cast high pressure steam/water tubes. The fluid is further heated as it passes through the metal pipe chamber 26a, which is integral with the exhaust manifold 26.

Fluid flow through both the cylinder head and exhaust manifold is preferred, although fluid flow through one or the other or both could be eliminated, as this effects the greatest preheating of the fluid from the booster pump 21.

The partially vaporized, high pressure fluid then passes via a conduit 28 from an exhaust manifold chamber port or outlet 27 to the fluid intake 30 of exhaust stack boiler 31.

Exhaust stack boiler 31 is a waste heat recovery heat exchanger where superheated vapor at approximately 1000 psia is generated from the energy in the engine exhaust gases. Exhaust gases generated during the operation of the engine 50 are passed to the exhaust manifold 26 via a conduit 29 and collected and expanded therein. Typically, these hot exhaust gases are vented to the atmosphere from an exhaust manifold, thereby resulting in a significant loss of heat energy. Even in turbocharged systems, wherein the expanded exhaust gases are partially harnessed and used to increase the power output of the engine, the exhaust gases exiting the turbocharger are at an elevated temperature. The present invention utilizes this heat energy which it typically lost to the environment to fire the exhaust stack boiler 31.

In the preferred embodiment in which the engine is turbocharged, exhaust gases exit manifold 26 through a second outlet 42 and are routed to a turbocharger 48, which utilizes the exhaust flow to drive a turbine, which in turn drives a compressor capable of supplying air under pressure to an intake manifold of the engine. Hot exhaust gases exiting the turbocharging unit at outlet 44 are then routed via conduit 45 to an inlet 46 provided on stack boiler 31. In non-turbocharged systems, the exhaust gases collected in exhaust manifold 26 are routed directly to an intake 46 on an exhaust stack boiler 31. In the present example, the exhaust gas flow rate is approximately 50 lb/min. and the exhaust gas inlet temperature to the boiler is approximately 1100° F.

Since the source of heat for the heat exchanger is the exhaust gas generated during engine operation, it is preferred that a tube and fin-type heat exchanger be used, with the exhaust gas passing over the fins. Other types of heat exchangers or boilers having high pressure and high temperature capabilities can also be used in accordance with the present invention. Heat exchangers for diesel engine exhaust gas which may be used in accordance with the present invention are manufactured by Vapor Corporation at 6420 West Howard Street, in Chicago, Ill. The size of the heat exchanger will be a function of the fluid inlet temperature to the exhaust stack boiler. The greater the temperature of the preheated fluid entering into the inlet of the exhaust stack boiler, the greater the reduction in size of the exhaust stack boiler which can be achieved. It can be appreciated that by integrating the Rankine cycle into the diesel system, and collecting an amount of heat energy during passage of the working fluid through the oil cooler 15, cylinder head 23 and exhaust manifold 26, a substantial preheating of the working fluid occurs. This is of significant practical importance, since the cost of the stack boiler represents a substantial cost in the manufacture of the system and since the integrated system of the present invention should be sufficiently compact to fit under the hood of a diesel powered vehicle.

Fin spacing in the stack boiler may range from 5–9 fins/inch. It is preferred, however, that the fin spacing be limited to 6 fins/inch in order to avoid potential fouling of the heat transfer surfaces.

In the present embodiment, the water collects an additional amount of heat of approximately 5300 Btu/min. as it passes in a heat transfer relation through exhaust stack boiler 31. Superheated steam at approximately 1000 psia and approximately 950° F then exits the exhaust stack boiler 31 at an outlet 32 and flows through a conduit 33 to an intake valve 34 located on expander cylinder 35 of the diesel engine. In this preferred embodiment, the expander cylinder 12 is the sixth cylinder of the Cummins L-10 engine. Other cylinders can be used in accordance with the present invention, however it is preferred that one of the cylinders located at the end of the engine be used, since the cylinder can then easily be isolated from the remaining diesel cylinders. The expander cylinder serves as the power recovery device for the bottoming cycle. When an intake valve on the expander cylinder opens, the steam enters the top of the cylinder 35. When the intake valve closes, the steam expands, causing a piston within the cylinder to move downward. The piston is coupled to an output component from which the work output or mechanical energy output of the engine is available.

Exhaust gases generated during the exhaust or compression stroke of the piston exit the expander cylinder 35 at an exhaust outlet 36 at approximately 30 psia. The exhaust gases, which are slightly superheated, pass through a conduit 37 to an inlet 38 located at the top of fluid source 10 and mix with other coolant accumulated therein. The mixing causes the entering exhaust vapor to condense into a partially saturated state which is then available for recycling through the system.

Figure 2:
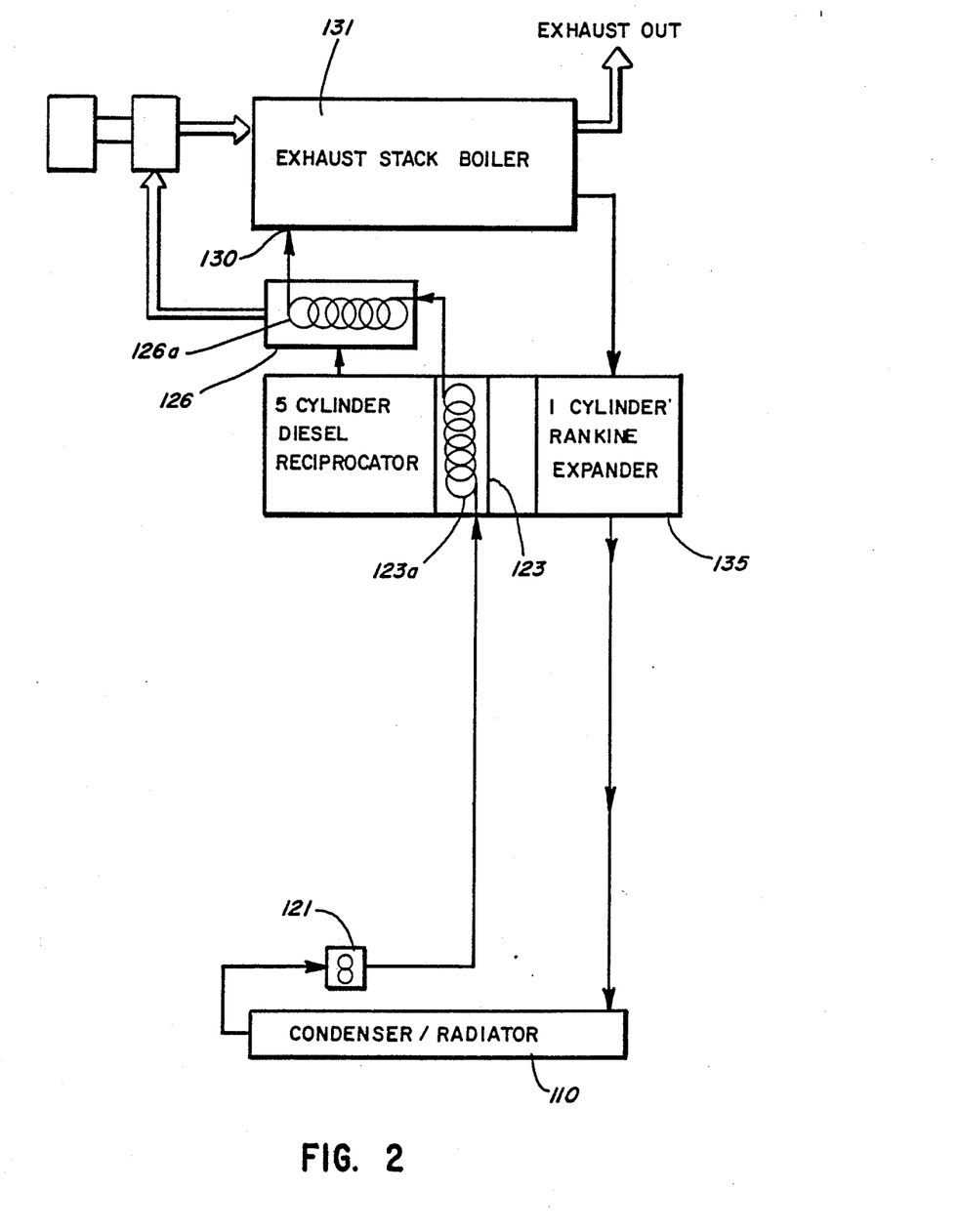
FIG. 2 is a schematic of an alternate embodiment of the present invention.
Figure 3:
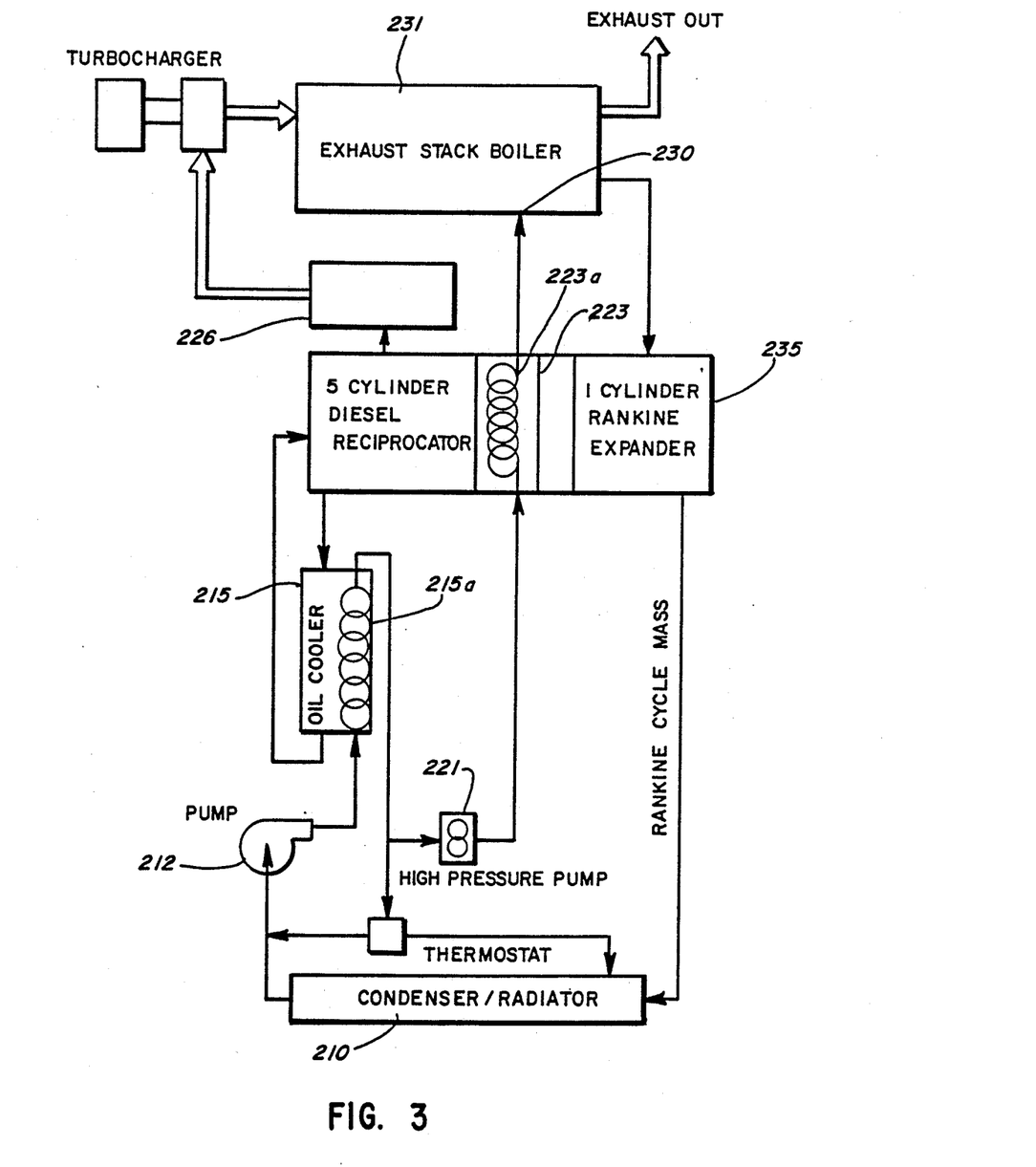
FIG. 3 is a schematic of another alternate embodiment of the present invention.

In FIGS. 2 and 3 there are shown two alternate embodiments of the integrated diesel/Rankine system of the present invention.

In the alternative embodiment shown in FIG. 2, a portion of the engine cooling fluid is passed from the fluid source 110 directly to the intake of a high pressure booster pump 121 for immediate entry into the Rankine cycle. The elements which have heretofore been shown and described in FIG. 1 are the same as the elements in FIG. 2 in the 100 series. However, in this alternative embodiment, oil cooler 15 of FIG. 1 is either bypassed or omitted from the system entirely and accordingly in this embodiment does not form part of the heat transfer means. Thus it can be appreciated that fluid passage through the oil cooler is not necessary to the present invention, but is preferred. The result of omitting passage of the working fluid through the oil cooler may be a slight decrease in the temperature of the working fluid at exhaust stack boiler inlet 130. In FIG. 2 the heat transfer means comprises passageway 123a in the cylinder head 123 and the exhaust manifold 126. The remainder of the operation of FIG. 2 is the same as described with reference to FIG. 1.

In FIG. 3 there is shown another alternative embodiment of the integrated diesel/Rankine system according to the present invention, in which the heat transfer means comprises the oil cooler and the cylinder head. The elements which have hereto been shown and described in FIG. 1 are the same as the elements in FIG. 3, in the 200 series. In this embodiment, after passing through oil cooler 215, a portion of the working fluid is pumped by a high pressure pump 221 through passageways 223a cast directly into the cylinder head 223 and immediately to an intake 230 of the waste heat recovery heat exchanger, designated as exhaust stack boiler 231 in FIG. 3. The working fluid flow path thus bypasses exhaust manifold 226 in this alternative embodiment. The primary result of bypassing the exhaust manifold is a decrease in the preheating of the working fluid which occurs prior to entry into exhaust stack boiler 231 and a loss of heat to the environment which might otherwise be recovered in accordance with the preferred embodiment. A system in accordance with this embodiment may thus require a waste heat recovery heat exchanger larger than that required for the preferred embodiment. This is because, as heretofore described, the size of the heat exchanger is directly related to the heat exchanger inlet temperature.

In the system described in each of the foregoing embodiments, one of the cylinders of the base diesel engine is used as the power recovery device. It will be appreciated by those skilled in the art that the expander cylinder will produce power every revolution, whereas the remaining cylinders of the engine operate on a four-stroke cycle. Thus, as also will be appreciated by one of ordinary skill in the art, the cam and valve systems for the expander cylinder may be different than for the other five cylinders.

The intake valve on the expander cylinder should open rapidly to allow all of the working fluid into the cylinder quickly and still have time for the expansion work. A rapidly opening valve should provide greater thermal efficiency of the system. A sliding valve is preferably used for this purpose, however, those skilled in the art will recognize that other types of valves used in steam reciprocating engines may also be used.

Figure 4:
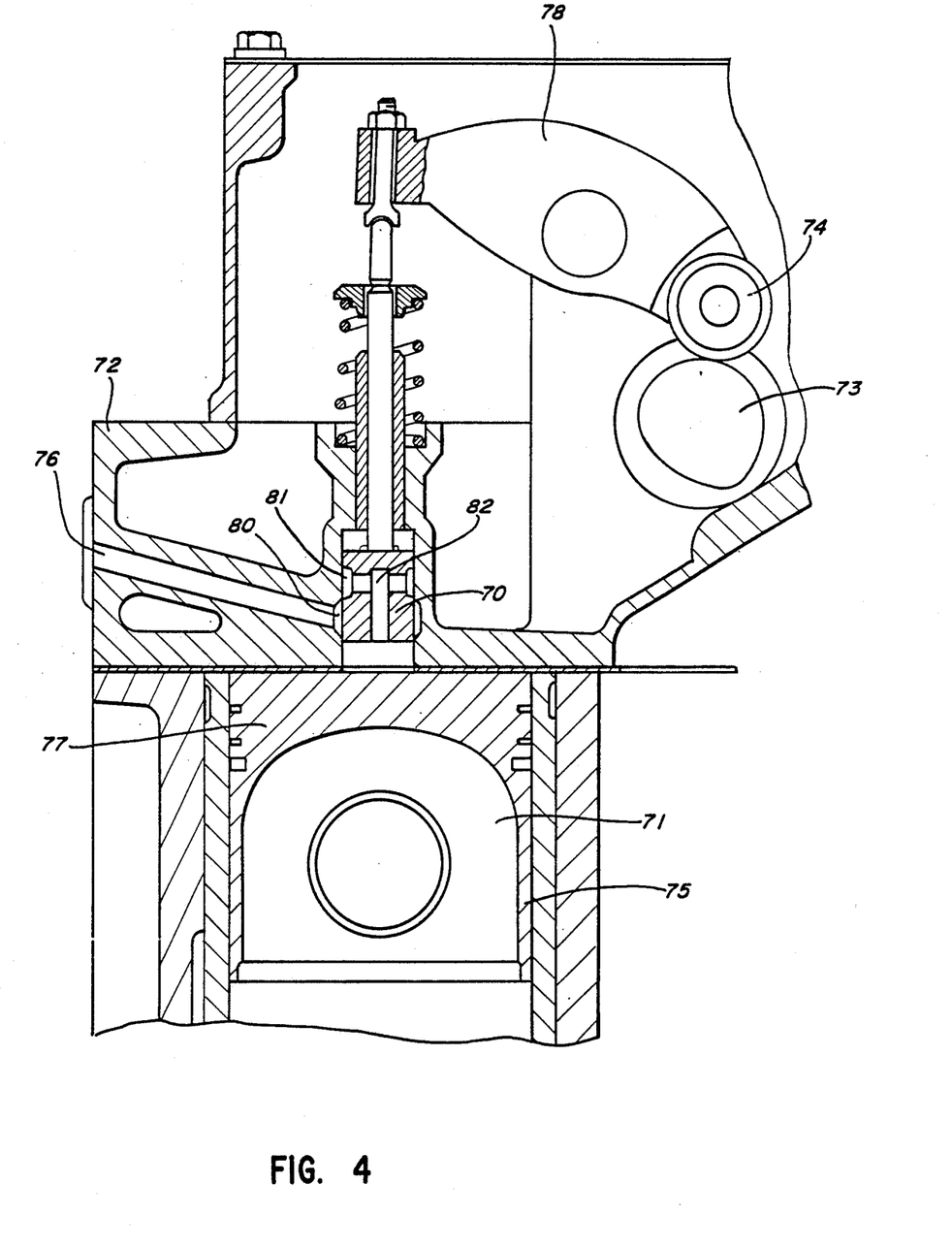
FIG. 4 is a cross section of an intake valve arrangement for the vapor expander.

Referring then to FIG. 4, there is shown one embodiment of the intake valve arrangement for the vapor expander cylinder, including a sliding valve 70 and an expansion piston 71. The expansion piston 71, which is disposed within the cylinder 75 preferably has a flat top portion in order to reduce the dead volume space between the piston 71 and the cylinder head 72. This is in contrast to the remaining diesel pistons, which have combustion chambers at or near the top and accordingly are not very flat.

During operation of the integrated system, the high temperature high pressure vapor is introduced into a vapor intake path 76 in the cylinder head 72. When expansion piston 71 reaches a point near the top dead center of the cylinder 75 the cam on the cam shaft 73 pushes a follower roller 74 which in turn causes a rocker arm 78 to push the sliding valve 70 in a downward direction. An inlet port 81 on the sliding valve 70 is aligned with a port 80 of the steam path. The high temperature high pressure vapor then passes through a path 82 in sliding valve 70 into an expansion space 77 between the cylinder head 72 and piston 71, pushing the piston downward.

At a crank angle of approximately 20 to 30 degrees after the top dead center position, the sliding valve 70 closes and the high temperature high pressure vapor expands in the expansion space 77 until the expansion piston 71 reaches a point in the cylinder near the bottom dead center. At this point, as is well known in the art, an exhaust valve (not shown in the drawing) opens and exhausts the gases generated during the compression stroke.

The exhaust valve event can be more gradual, and therefore can be the same as that of the base diesel engine. The exhaust valve will not, however, require high temperature alloys, since the temperature of the vapor exiting through the valve is fairly low. Moreover, the same cam that operates the valves and the injectors in the remaining diesel cylinders can be used for the expander cylinder, providing the required valve events are accomplished by modifications such as double-lobed steep ramp cam profile.

Those skilled in the art will recognize that there are several possibilities for the configuration of the engine. In a first embodiment, the firing order of a regular 5-cylinder engine may be used for the first five cylinders (1-2-4-5-3-1), with the expander cylinder positioned at a 180 degree crank angle from the No. 1 cylinder. This embodiment requires a counter-balancer at the expander cylinder to take the first order unbalance out. Alternatively, the crank shaft may be the same as that for a conventional six cylinder engine with an uneven firing order.

It will also be recognized by those skilled in the art that the system of the present invention operates most efficiently when the gases of combustion exiting the engine have sufficient heat content to vaporize the working fluid. Upon engine start up, when the engine is still cold, or at low or no load situations when the engine is running at a low rate of speed and is consuming little fuel, the waste heat in the exhaust gases is at a relatively low temperature and may be insufficient to generate the high pressure vapor to drive the piston in the expander cylinder. Moreover, the heat being dissipated from the cylinder head and exhaust manifold will be low enough such that a significant preheating of the circulating fluid may not be achieved. Thus it is contemplated that a control system is provided to control the flow of the circulating fluid into the Rankine cycle at low levels of output. Such types of control systems are generally known in the art. One type of control system which may be used in accordance with the present invention is disclosed in U.S. Pat. No. 3,979,913. It is envisioned, however, that any number of control systems including various types of temperature-controlled valves, which are normally closed until the engine reaches steam generating temperature, can be used in accordance with the present invention.

What is claimed is:

1. An integrated diesel/Rankine cycle system for using heat in a multicylinder diesel engine to generate high temperature, high pressure vapor from a circulating stream of engine cooling fluid to drive at least one piston disposed within at least one power cylinder of said diesel engine, said system comprising:

a reservoir of engine cooling fluid;

oil cooling means connected to said engine for recycling heated engine oil and connected to said reservoir for receiving said engine cooling fluid and bringing said fluid into heat exchange relation with heat dissipated from said heated engine oil for heating said engine cooling fluid;

said oil cooling means further comprising an outlet for discharging said heated engine cooling fluid;

first conduit means in communication with said oil cooling means outlet for receiving the discharged heated engine cooling fluid;

high pressure pump means connected to said first conduit means for drawing off a portion of said discharged heated engine cooling fluid from said first conduit means while the remaining discharged heated engine cooling fluid continues to flow in said first conduit means;

thermostat means connected to said first conduit means in parallel with said high pressure pump means, and responsive to the heat of the remaining discharged heated engine cooling fluid flowing in said first conduit means and controlling the flow thereof to said reservoir and said oil cooling means;

cylinder head passageways connected to said high pressure pump means for receiving said heated engine cooling fluid and bringing said heated fluid into heat exchange relation with additional heat discharged from said engine for further heating said engine cooling fluid;

exhaust manifold means connected to said passageways for receiving said heated engine cooling fluid and further bringing said heated fluid into heat exchange relation with additional heat dissipated from said engine for further heating said heated engine cooling fluid;

waste heat recovery means connected to said exhaust manifold means for receiving said heated engine cooling fluid and vaporizing same in response to heat dissipated from said engine;

said power cylinder of said multicylinder engine having an inlet connected to said waste heat recovery means for receiving said vaporized fluid and driving said piston within said engine power cylinder and an outlet for exhausting said vaporized fluid during a predetermined segment of piston travel within the cylinder; and second conduit means in communication with said power cylinder exhaust outlet and said reservoir for effecting circulation of exhaust gases from said power cylinder to said reservoir and condensing and recycling same.

* * * * *